Patented Oct. 12, 1926.

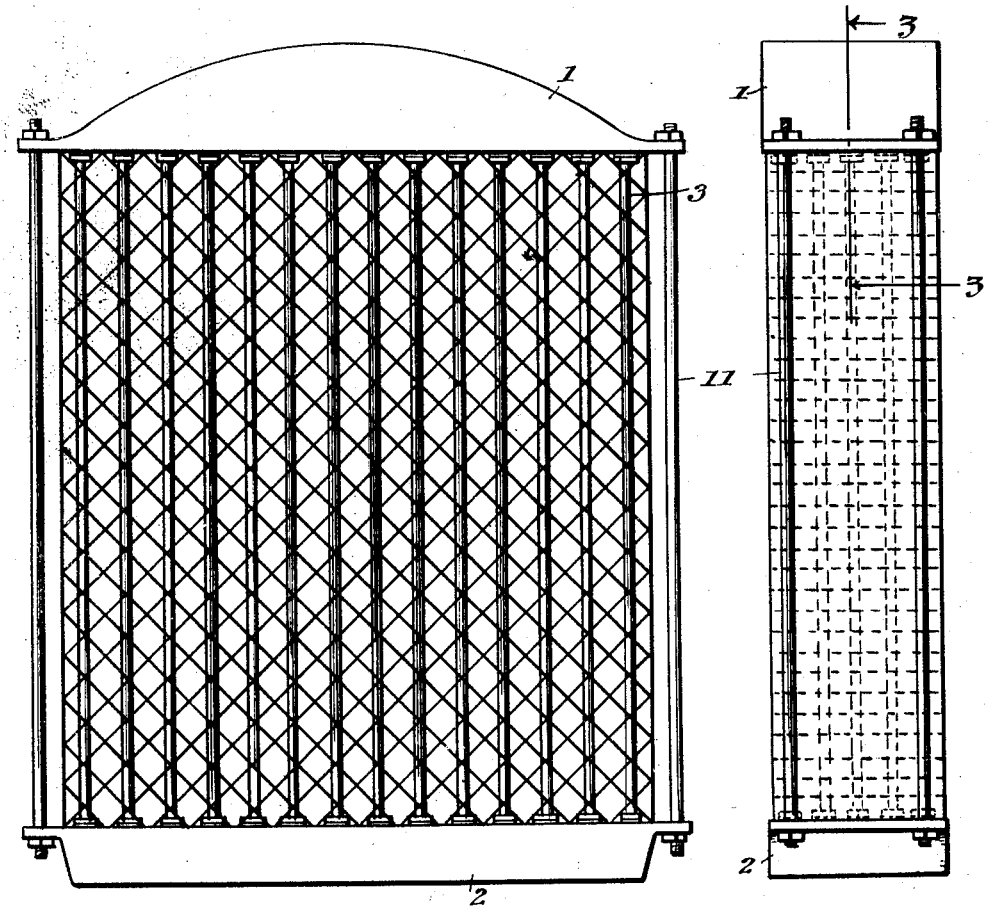

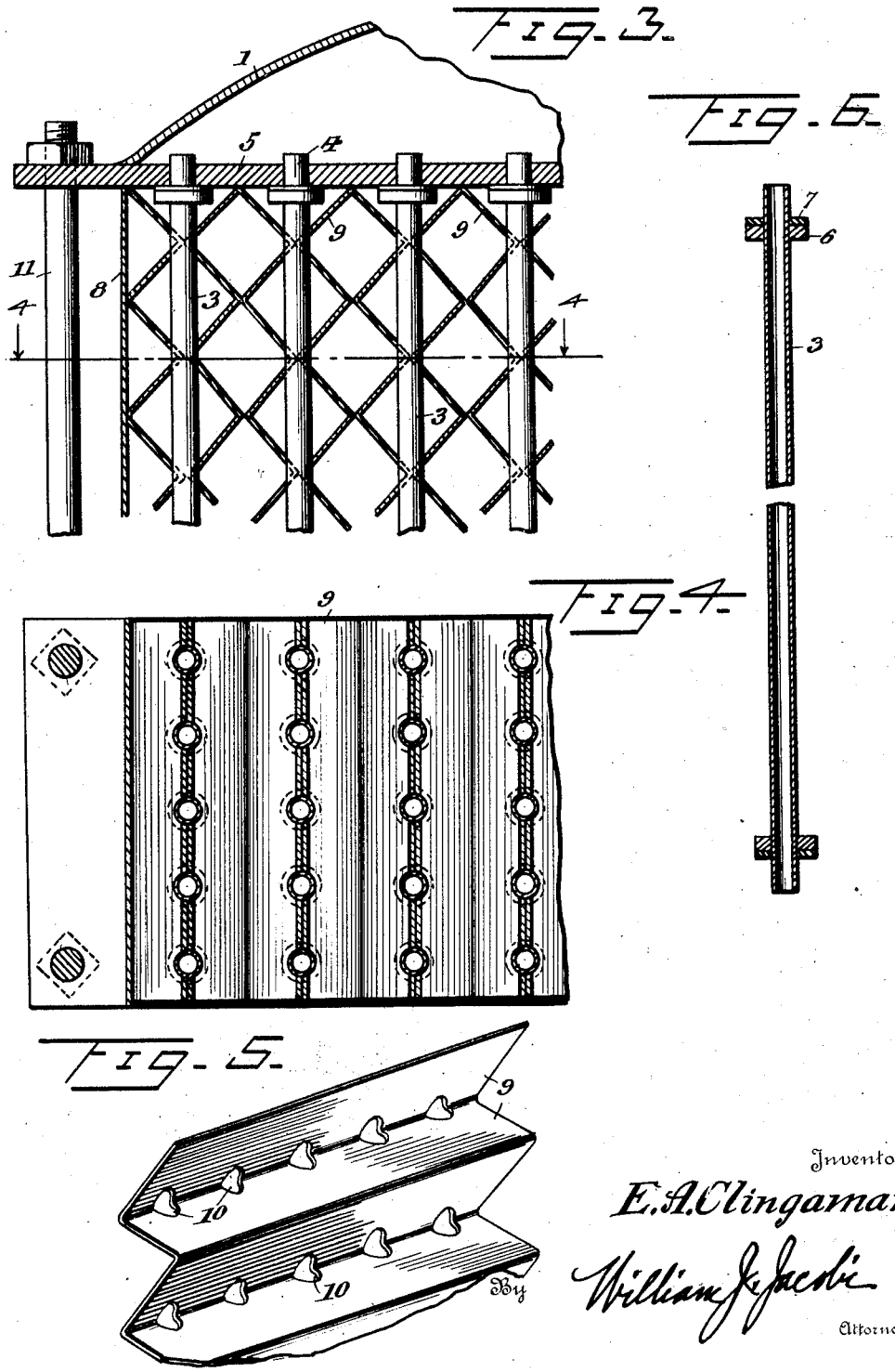

1,602,811

UNITED STATES PATENT OFFICE.

EMMET A. CLINGAMAN, OF LYONS, OHIO.

AUTOMOBILE RADIATOR.

Application filed March 31, 1923. Serial No. 629,089.

This invention relates to automobile radiators and has for its primary object to provide a device of this character wherein the pipes and heat dissipating plates, which constitute the core of the radiator are adapted to be connected with the upper and lower reservoirs of the radiator without the need of soldering same.

A further object of my invention is to provide an automobile radiator consisting of an upper and lower reservoir, pipes connecting the reservoirs, heat dissipating plates spaced between the pipes and upper and lower reservoirs and means for holding the upper and lower reservoirs into engagement with the water pipes to make a watertight connection between the reservoirs and the pipes.

A still further object of my invention is to provide a radiator of the above described character wherein the parts necessary to form the core of the radiator are secured to the reservoirs without the use of solder and wherein the said parts can be removed and replaced with a new part, which is necessary when the pipes freeze and break or if by accident the pipes and coolers are damaged.

An additional object of my invention is to provide a device of the above described character, which is simple in construction, durable, efficient for the purpose intended and one that can be manufactured and placed on the market at a relatively low cost.

These and like objects of my invention will be better understood as the description proceeds and as is specifically pointed out in the appended claim.

Referring to the accompanying drawing which forms a part of this specification for the purpose of illustrating my invention.

Figure 1 is a front elevation of a radiator constructed in accordance with my invention.

Figure 2 is a side elevation of same.

Figure 3 is a vertical transverse section taken on line 3—3 of Fig. 2.

Figure 4 is a horizontal section taken on line 4—4 of Fig. 3, and

Figure 5 is a fragmentary detail view of one of the cooler plates.

Figure 6 is a section view of one of the pipes.

Referring to the drawings in detail, like characters will be used to designate like parts in the different views.

The numeral 1 indicates the upper reservoir of a radiator, of the automobile type, which is of the usual construction. 2 indicates the lower reservoir, the upper face of which is provided with a series of openings and adapted to correspond in number with the openings located on the underside of the upper reservoir. Positioned between the upper and lower reservoirs are water pipes 3, the ends of which are indicated by the numeral 4 and are adapted to pass through openings in the relatively thick faces 5 of the lower plate of the upper reservoir and the upper plate of the lower reservoir. Adjacent each end of the pipe 4 a collar 6 is formed on same and positioned on each collar is a washer 7, which is adapted to engage the relatively thick plate 5 of the upper and lower reservoirs when the pipes 3 are placed in position for the purpose of forming a watertight connection between the reservoirs and the pipes. Wall members 8 are clamped between the reservoirs. Positioned between each series of pipes 3 and between the pipes and the side walls 8 of the radiator are heat dissipating plates 9. The heat dissipating partitions 9 are of corrugated formation and are provided with openings 10 so that when the partitions are placed in position between the pipes, the pipes 3 rest in or against the openings 10, thus allowing the corrugated edges of the partitions to rest in engagement with each other, as is clearly shown in Figs. 3 and 4.

Bolts 11, two of which are positioned on each side of the radiator are used for clamping the upper and lower reservoirs into engagement with the water pipes 3. The washers 7 supported on the shoulders 6 of the pipes 3 prevent a leakage between the reservoirs and the pipes.

In case any of the pipes 3 should freeze and break, all that would be necessary would be to unfasten the bolts 11, remove the upper reservoir, then remove the broken pipe, replace same with a new one and then replace the upper reservoir and fasten same with the bolts 11. The same operation would follow in case one of the dividers or cooler partitions should become damaged.

It is thought that in view of the foregoing description of my invention taken in connection with the accompanying drawings that further explanation as to the operation, construction and objects of my invention are unnecessary.

While I have shown and described the preferred form of my invention, I realize that various minor changes may be resorted to, without departing from the spirit and scope of the invention as claimed, therefore, I do not wish to limit myself to the exact details of construction shown, nor the combination and arrangement of parts and material used.

What I claim as new and desire to secure by Letters Patent is:

A radiator structure comprising header members spaced from each other, pipes passing through the inner walls of the header members and having shoulders against which the inner surfaces of said walls bear, angularly corrugated plates interposed between the header members and the pipes and bearing at opposite edges against the inner surfaces of the header members, each alternate apex of each plate having arcuate openings adapted to receive side portions of the pipes and means for drawing the header members toward each other whereby the edges of the openings in the plates are brought in close contact with the surfaces of the pipes.

In testimony whereof I affix my signature.

EMMET A. CLINGAMAN.